: US 8,244,956 B2
(45) Date of Patent: Aug. 14, 2012

(12) United States Patent
Laor et al.

(54) MECHANISM FOR AUTOMATIC ADJUSTMENT OF VIRTUAL MACHINE STORAGE

(75) Inventors: Dor Laor, Tel Aviv (IL); Shahar Frank, Ramat Hasharon (IL); Uri Lublin, Raanana (IL); Avi Kivity, Tel Aviv (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 328 days.

(21) Appl. No.: 12/627,781

(22) Filed: Nov. 30, 2009

(65) Prior Publication Data
US 2011/0131443 A1 Jun. 2, 2011

(51) Int. Cl.
G06F 12/00 (2006.01)
(52) U.S. Cl. .............................. 711/6; 711/147; 711/170
(58) Field of Classification Search .................. None
See application file for complete search history.

(56) References Cited

U.S. PATENT DOCUMENTS
7,716,446 B1 * 5/2010 Chen et al. ..................... 711/170
* cited by examiner Primary Examiner — Shawn X Gu
(74) Attorney, Agent, or Firm — Lowenstein Sandler PC

(57) ABSTRACT

A mechanism for automatic adjustment of virtual machine (VM) storage is disclosed. A method of embodiments of the invention includes stopping, by a host computing device, a virtual machine (VM) hosted by the host computing device from running upon detecting a write error due to lack of storage on the VM, communicating, by the host computing device, an out-of-storage notification from a hypervisor of the host computing device to a host management agent, and sending, by the host computing device, data associated with the out-of storage notification and the VM to a host controller that manages the host computing device, wherein the host controller causes storage for the VM to be increased.

20 Claims, 4 Drawing Sheets

MECHANISM FOR AUTOMATIC ADJUSTMENT OF VIRTUAL MACHINE STORAGE

TECHNICAL FIELD

The embodiments of the invention relate generally to virtual machine systems and, more specifically, relate to a mechanism for automatic adjustment of virtual machine storage.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote user. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the the user of the VM.

Recently, solutions providing centralized hosting for VMs that run (virtual) desktops have been developed. Such solutions consist of centralized servers that are partitioned into multiple VMs that host the VMs, thereby providing a desktop for each user. The centralized hosting provides the manageability of sever-based computing, while the dedicated environment provides the flexibility and compatibility with applications that a desktop enables.

However, one problem that arises with centralized hosting of VMs is that it demands large allocation of storage for all of the VMs. Such large allocation of storage is especially painful when there are many VMs being hosted, a common scenario in desktop virtualization. In order to deal with this problem, sparse storage allocation solutions have been developed to address the problem.

With a sparse storage allocation solution, each VM is allocated some minimum storage space out of the shared pool of storage. The storage allocation per VM is usually a small amount that is allocated on-demand; rather than allocating to each VM the maximum amount of storage that the VM may use. Virtualization systems require storage allocation in this sparse manner in order to conserve disk space for use only by VM systems that require the storage.

During VM execution, more disk space is generally allocated on-the-fly as needed. However, under this system, a VM will most likely reach a certain point where it has utilized all available disk space that it has been allocated. At this point, conventional systems require some sort of human interaction to stop the VM, adjust the storage allocation to the VM, and may even require restarting the VM. Furthermore, if the VM is not stopped when it runs out of storage, then additional problems may occur, such as guest fs confusion/recovery, high CPU usage, and so on. Such manual interaction and other resulting problems are costly in terms of overhead and time-consuming in terms of performance. As such, a mechanism for automatic adjustment of virtual machine storage without manual user intervention would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
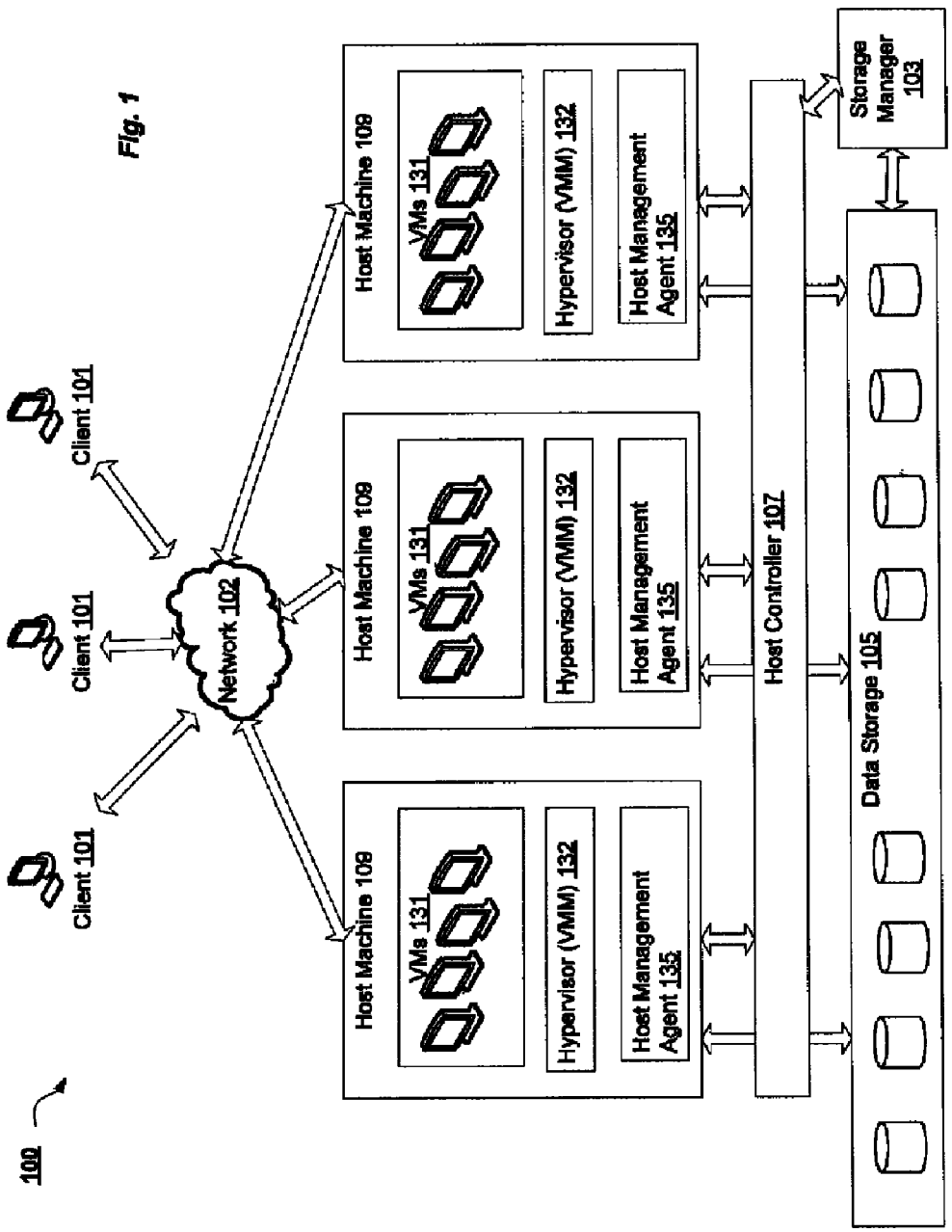
FIG. 1 is a block diagram of an exemplary network architecture in which embodiments of the present invention may operate.

Embodiments of the invention provide a mechanism for automatic adjustment of virtual machine (VM) storage. A method of embodiments of the invention includes stopping, by a host computing device, a virtual machine (VM) hosted by the host computing device from running upon detecting a write error due to lack of storage on the VM, communicating, by the host computing device, an out-of-storage notification from a hypervisor of the host computing device to a host management agent, and sending, by the host computing device, data associated with the out-of storage notification and the VM to a host controller that manages the host computing device, wherein the host controller causes storage for the VM to be increased.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for automatic adjustment of virtual machine (VM) storage. Some virtualization systems allocate minimal storage to VMs in order to save storage space on the disk. Consequently, during VM execution, more disk space may be needed by a VM, which will be allocated to the VM on-the-fly as needed. Embodiments of the invention eliminate any human interaction previously required to provide this additional storage allotment to VMs. Specifically, embodiments of the invention determine when a VM has reached a threshold storage utilization, stop the VM, adjust storage allocation for the VM, and resume the VM, all in an automated manner which precludes manual user intervention.

FIG. 1 illustrates an exemplary network architecture 100 in which embodiments of the present invention may operate. The network architecture 100 includes a cluster of host machines 109 coupled to one or more clients 101 over a network 102. The network 102 may be a private network (e.g., a local area network (LAN), a wide area network (WAN), intranet, etc.) or a public network (e.g., the Internet). In one embodiment, host machines 109 may be known as host computing devices that include at least a processor and a memory. Each host machine 109 may be a server computer that includes one or more virtual machines (VMs) 131. In some embodiments, clients 101 may be hosted directly by host machine 109 as a local client on host machine 109.

The host machines 109 are also coupled to data storage 105. The data storage 105 includes one or more mass storage devices (e.g., disks), which form a storage pool shared by all of the host machines 109. In one embodiment, the data storage 105 is a network-based storage system, such as network attached storage (NAS), storage area networks (SANs), or other storage systems. In one embodiment, data storage 105 may be coupled to a storage manager 103 that performs managerial functions for the data storage 105. The storage manager 103 may reside on a dedicated machine or share the machine with other components of system 100.

The clients 101 may include computing devices that have a wide range of processing capabilities. Some of the clients 101 may be thin clients, which have limited processing and memory capacities. For example, a thin client may a laptop computer, cellular phone, personal digital assistant (PDA), a re-purposed desktop computer, etc. Some of the clients 101 may be thick (fat) clients, which have powerful CPUs and large memory. For example, a thick client may be a dual-core or multi-core computer, workstation, graphics workstation, etc. The client 101 may run client applications such as a Web browser and a graphic user interface (GUI). The client 101 may also run other client applications, which receive multimedia data streams or other data from one or more host computers 109 and re-direct the received data to a local display or other user interface.

As mentioned previously, each host machine 109 may run one or more VMs 131. Each VM 131 runs a guest operating system (OS) that may be different from one VM to another. The guest OS may include Microsoft Windows, Linux, Solaris, Mac OS, etc. Furthermore, each host machine 109 may include a hypervisor 132 that emulates the underlying hardware platform for the VMs 131 that it hosts. The hypervisor 132 may also be known as a virtual machine monitor (VMM) or a kernel-based hypervisor. In some embodiments, the hypervisor 132 is part of a host operating system.

Each VM 131 can be accessed by one or more of the clients 101 over the network 102. In one scenario, each VM 131 provides a virtual desktop for the client 101. From the user's point of view, the virtual desktop functions as a physical desktop (e.g., a personal computer) and is indistinguishable from a physical desktop.

The host machines 109 may be managed by a host controller 107. The host controller 107 may be a separate machine coupled to the host machines 109 directly or via a network. Alternatively, the host controller 107 may be part of one of the host machines 109. The host controller 107 may add a VM 131, delete a VM 131, balance the load on the cluster of host machines 109, provide directory service to the VMs 131, and perform other managerial functions. Additionally, each host machine 109 includes a host management agent 135. The host management agent is responsible for managing all of the activities related to VM maintenance, including resource allocation (e.g., storage, RAM, networking, etc.), VM initialization, VM monitoring, VM termination, controlling some dynamic capabilities of the VM, and so on.

According to one embodiment of the present invention, each VM 131, upon initialization, is allocated some minimum storage space out of the shared pool of storage 105. It should be noted that although embodiments of the invention are described in terms of a shared pool of storage, it is envisioned that embodiments of the invention may also be equally applied to local or remote non-shared storage architectures. The storage allocation per VM 131 is typically a sparse amount that is allocated on-demand. In such a system a VM 131 is not allocated the maximum amount of storage 105 that the VM may use. Virtualization systems require storage allocation in this sparse manner in order to conserve disk space for use only by VM systems that truly require the storage. During VM execution, more disk space is generally allocated from the shared storage pool 105 on-the-fly and as needed. However, previous techniques to handle this additional allotment of storage to a VM were not done automatically and consequently required some sort of manual intervention by a human.

In one embodiment of the invention, when a VM 131 fully utilizes its current storage allotment, a fault (write error) is generated due to the lack of storage space. An exit from the VM 131 is made upon the write request and resulting fault, and the write-error is then seen by the hypervisor 132. The hypervisor 132 examines an ID of the fault and determines that the fault was caused by the out-of-storage write error (in cases of an actual out-of-storage error). Subsequently, the hypervisor 132 sends an out-of-storage notification identifying the particular VM 131, and in some embodiments the faulting storage, to the host management agent 135 on the host machine 109. In one embodiment, the out-of-storage notification is provided to the host management agent 135 via an application programming interface (API).

At this point, the host management agent 135 sends the data received from the hypervisor 132, including the out-of-storage notification and the VM 131 identification, to the host controller 107. In turn, the host controller 107 generates a request to increase the storage allotment from the shared storage pool 105 to send to a storage manager of the shared storage pool 105. In one embodiment, the storage manager may be the central storage manager 103 previously described above, or it may be a storage pool manager enabled in one of the host machines 109 (not shown) or in the host controller 107. The storage manager will then allot additional storage for the VM 131 and send a message back to the host controller 107 that the VM 131 may resume operations. This message is propagated to the host management agent 135 that originated the request, which then notifies the hypervisor 132 and it causes the VM 131 to be re-activated. This notification between the host management agent 135 and the hypervisor 132 may take place utilizing another API.

Figure 2:
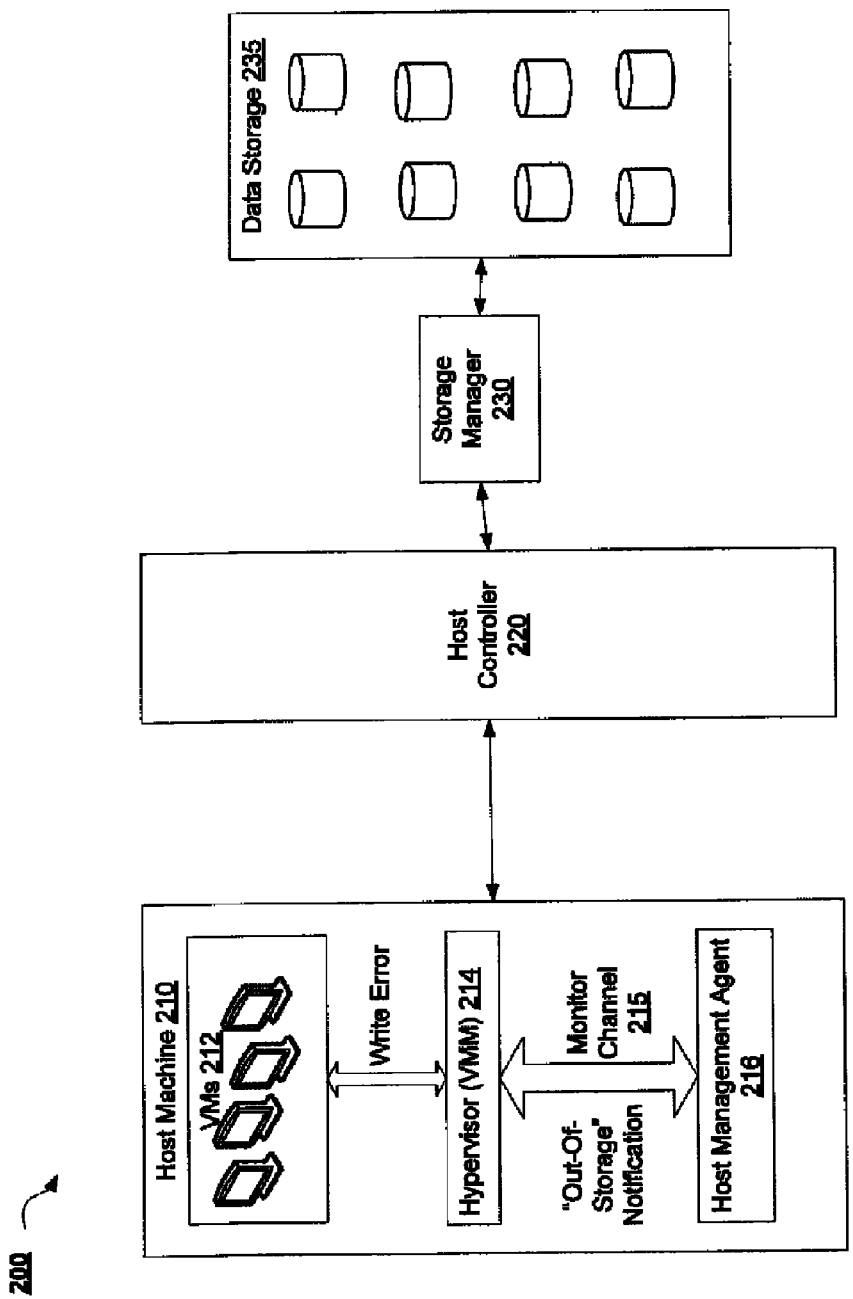
FIG. 2 is a block diagram of a detailed view of a virtualization environment for automatic storage adjustment for virtual machines.

FIG. 2 illustrates a block diagram of a detailed view of a virtualization environment 200 for automatic storage adjustment for VMs. Virtualization environment 200 includes a host machine 210, a host controller 220, a storage manager 230, and data storage 235. In one embodiment, these components are the same as host machine 109, host controller 107, storage manager 103, and data storage 105 described with respect to FIG. 1.

Host machine 210 hosts a plurality of VMs 212 that are virtualized by hypervisor 214. Host machine 210 also includes a host management agent 216 connected to hypervisor 214 via a monitor channel 215. According to one embodiment of the present invention, upon initialization each VM 212 is allocated some minimum storage space out of the shared pool of storage 235. As the VM 212 is not allocated its maximum amount of storage that it may use, it will typically require additional storage allocation at a later time when it has used its current storage allotment. In one embodiment, when the VM 212 utilizes its current storage allotment, a write error occurs on the VM 212 due to the lack of space and is, in turn, detected by the hypervisor 214.

Subsequently, the hypervisor 214 sends an out-of-storage notification identifying the particular VM 212, and in some cases the faulting storage, to the host management agent 216. The out-of-storage notification is sent to the host management agent 216 via a monitor channel 215 that communicably couples the hypervisor 214 and the host management agent 216. In one embodiment, the out-of-storage notification is provided via an API, as previously discussed.

At this point, the host management agent 216 sends the data received from the hypervisor 214, including the out-of-storage notification and the VM 212 identification (and possibly the identification of the faulting storage), to the host controller 220. In turn, the host controller 220 generates a request to increase the storage allocation for the VM 212 from the shared storage pool 235. The request is sent by the host controller 220 to a storage manager 230 of the shared storage pool 235. In one embodiment, the storage manager 230 may be a central storage manager associated with the data storage cluster 235 or a storage pool manager enabled in the host machine 210 (not shown).

The storage manager 230 then allocates additional storage for the VM 212 and sends a message back to the host controller 220 indicating that the VM 212 may be resumed. This message is propagated to the host management agent 216 that originated the request, which then notifies the hypervisor 214 via the monitor channel 215 that the VM 212 may be reactivated. This notification between the host management agent 216 and the hypervisor 214 may take place via another API.

Figure 3:
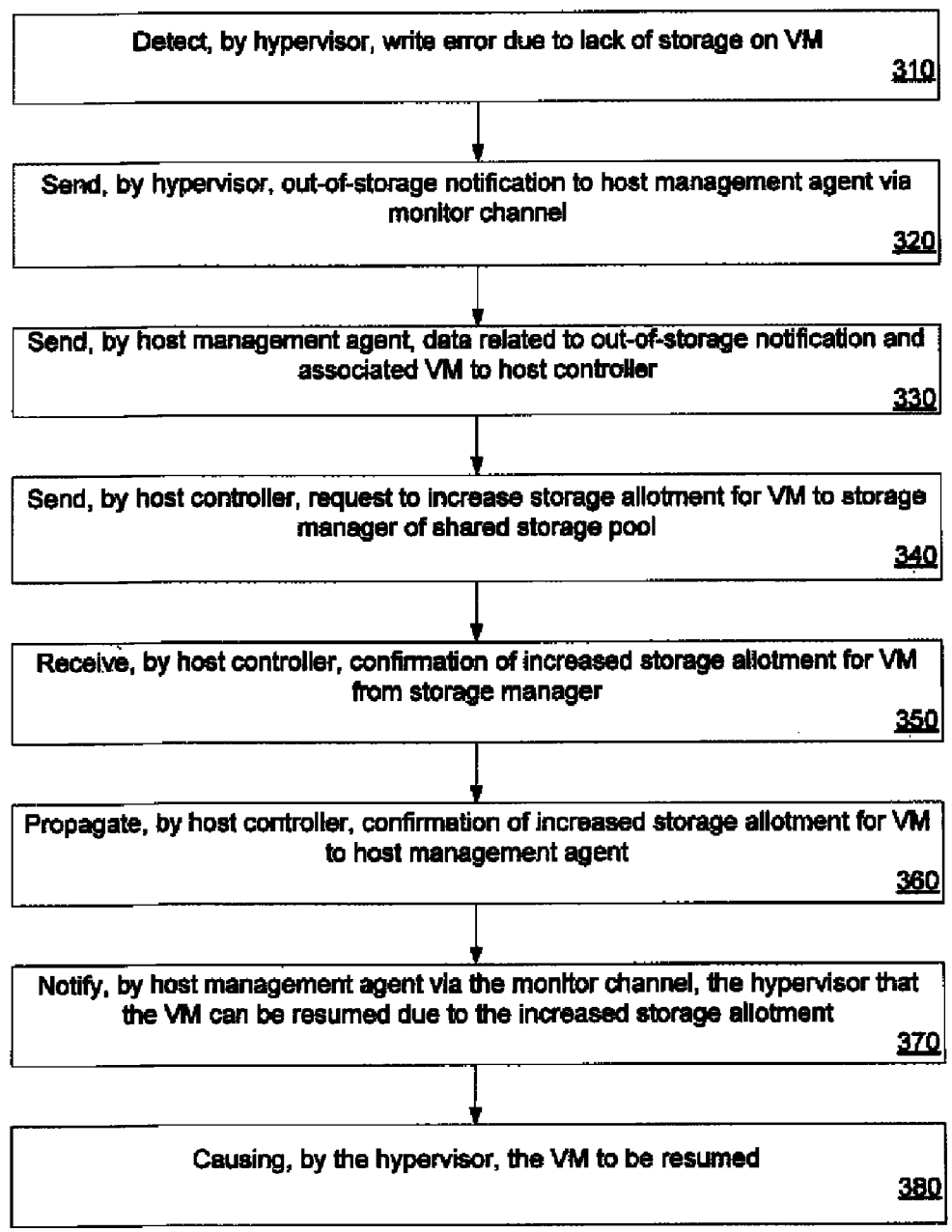
FIG. 3 is a flow diagram illustrating a method for automatic adjustment of virtual machine storage.

FIG. 3 is a flow diagram illustrating a method 300 for automatic adjustment of VM storage according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by the various components of virtualization environment 200 described with respect to FIG. 2.

Method 300 begins at block 310 where a hypervisor detects a write error due to a lack of storage on a VM that it hosts. At block 320, the hypervisor sends an out-of-storage notification to a host management agent via a monitor channel communicably coupling the two components. In one embodiment, an API is used to communication the out-of-storage notification between the hypervisor and the host management agent. The host management agent then sends data related to the received out-of-storage notification and associated VM to a host controller at block 330.

Subsequently, at block 340, the host controller generates and sends a request to increase the storage allotment for the VM to a storage manager of a shared storage pool. The storage pool may be shared amongst many VMs and VM host machines. As mentioned above, although embodiments of the invention are described in terms of a shared pool of storage, it is envisioned that embodiments of the invention may also be equally applied to local or remote non-shared storage architectures. In one embodiment, the storage manager utilizes the request sent from the host controller to allocate additional storage for the VM according to any number of storage allotment techniques, which are outside of the scope of embodiments of the invention. At block 350, the host controller receives confirmation of the increased storage allotment for the VM from the storage manager. The host controller then propagates this confirmation of the increased storage allotment for the VM to the host management agent at block 360.

The host management agent in turn notifies the hypervisor, via the monitor channel, that the VM can be resumed as the VM's storage allotment has been increased. In one embodiment, another API is used to communicate the increased storage notification between the hypervisor and the host management agent at block 370. Lastly, at block 380, the hypervisor causes the VM to be resumed, which now can operate correctly with its increased storage allotment. It is important to note that method 300 allows storage for a VM to be adjusted automatically without any manual user intervention.

Figure 4:
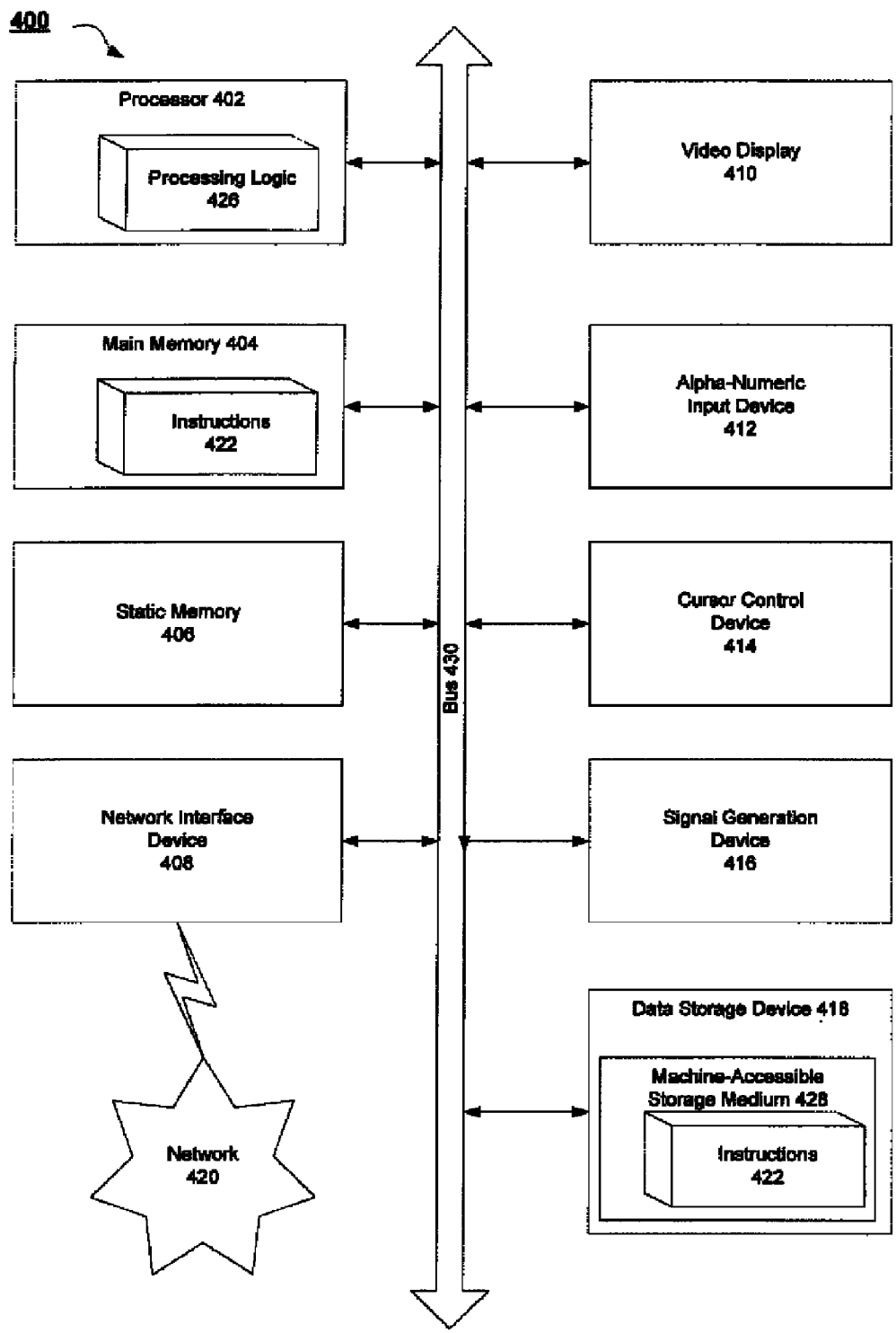
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform automatic adjustment of VM storage, such as that performed by method 300 described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   stopping, by a host computing device, a virtual machine (VM) hosted by the host computing device from running upon detecting a write error due to lack of storage on the VM;
   communicating, by the host computing device, an out-of-storage notification from a hypervisor of the host computing device to a host management agent; and
   sending, by the host computing device, data associated with the out-of storage notification and the VM to a host controller that manages the host computing device, wherein the host controller causes storage for the VM to be increased.

2. The method of claim 1, wherein the out-of storage notification is communicated from the hypervisor to the host management agent via a monitor channel communicably coupling the hypervisor and the host management agent.

3. The method of claim 1, wherein the out-of storage notification is communicated between the hypervisor and the host management agent utilizing an application programming interface (API).

4. The method of claim 1, further comprising:
   receiving, by the host management agent, confirmation of increased storage allotment for the VM from the host controller;
   notifying, by the host management agent, the hypervisor that it can resume the VM due to the increased storage allotment for the VM; and
   causing, by the hypervisor, the VM to be resumed upon receiving the notification that it can resume the VM from the host management agent.

5. The method of claim 4, wherein the host controller receives the confirmation of increased storage allotment for the VM from a storage manager subsequent to the storage manager increasing a storage allotment for the VM in response to a request from the host controller.

6. The method of claim 5, wherein the storage manager is at least one of a central storage manager that is part of a shared storage pool and a storage pool manager enabled in the host computing device.

7. The method of claim 4, wherein the notification from the host management agent to the hypervisor that it can resume the VM is sent via a monitor channel communicably coupling the hypervisor and the host management agent.

8. The method of claim 4, wherein the notification from the host management agent to the hypervisor that it can resume the VM is sent utilizing another application programming interface (API).

9. A system, comprising:
a memory;
a processor, communicably coupled to the memory;
one or more virtual machines (VMs) executed from the processor and the memory;
a hypervisor communicably coupled to the one or more VMs in order to manage the one or more VMs under a kernel-based virtualization model, the hypervisor operable to:
detect a write error at a VM of the one or more VMs due to a lack of storage at the VM;
stop the VM from running; and
generate an out-of-storage notification including information identifying the VM producing the write error; and
a host management agent communicably coupled to the hypervisor, the host management agent operable to:
receive the out-of-storage notification from the hypervisor; and
send data associated with the out-of storage notification and the identified VM to a host controller of the system, wherein the host controller causes storage for the VM to be increased by sending a request to increase storage for the VM.

10. The system of claim 9, wherein the out-of storage notification is communicated from the hypervisor to the host management agent via a monitor channel communicably coupling the hypervisor and the host management agent while utilizing an application programming interface (API).

11. The system of claim 9, wherein the host management agent is further operable to:
receive confirmation of increased storage allotment for the VM from the host controller; and
notify the hypervisor that it can resume the VM due to the increased storage allotment for the VM.

12. The system of claim 11, wherein the hypervisor is further operable to cause the VM to resume upon receiving the notification that it can resume the VM from the host management agent.

13. The system of claim 11, wherein the host controller receives the confirmation of increased storage allotment for the VM from a storage manager subsequent to the storage manager increasing a storage allotment for the VM in response to the request from the host controller.

14. The system of claim 13, wherein the storage manager is at least one of a central storage manager that is part of a shared storage pool and a storage pool manager enabled in the system.

15. The system of claim 11, wherein the notification from the host management agent to the hypervisor that it can resume the VM is sent via a monitor channel communicably coupling the hypervisor and the host management agent while utilizing another application programming interface (API).

16. A non-transitory machine-readable storage medium including instructions that, when accessed by a machine, cause the machine to perform operations comprising:
stopping a virtual machine (VM) hosted by a host computing device from running upon detecting a write error due to lack of storage on the VM;
communicating an out-of-storage notification from a hypervisor of the host computing device to a host management agent; and
sending data associated with the out-of storage notification and the VM to a host controller that manages the host computing device, wherein the host controller causes storage for the VM to be increased.

17. The non-transitory machine-readable storage medium of claim 16, wherein the out-of storage notification is communicated from the hypervisor to the host management agent via a monitor channel communicably coupling the hypervisor and the host management agent while utilizing an application programming interface (API).

18. The non-transitory machine-readable storage medium of claim 16, wherein the instructions, when accessed by a machine, cause the machine to perform further operations comprising:
receiving, by the host management agent, confirmation of increased storage allotment for the VM from the host controller;
notifying, by the host management agent, the hypervisor that it can resume the VM due to the increased storage allotment for the VM; and
causing, by the hypervisor, the VM to be resumed upon receiving the notification that it can resume the VM from the host management agent.

19. The non-transitory machine-readable storage medium of claim 18, wherein the host controller receives the confirmation of increased storage allotment for the VM from a storage manager subsequent to the storage manager increasing a storage allotment for the VM in response to a request from the host controller.

20. The non-transitory machine-readable storage medium of claim 18, wherein the notification from the host management agent to the hypervisor that it can resume the VM is sent via a monitor channel communicably coupling the hypervisor and the host management agent while utilizing another application programming interface (API).

* * * * *